W. H. HARTMAN.
Grain-Drill.
No. 51,178. 　　　　　　　　　　　Patented Nov. 28, 1865.
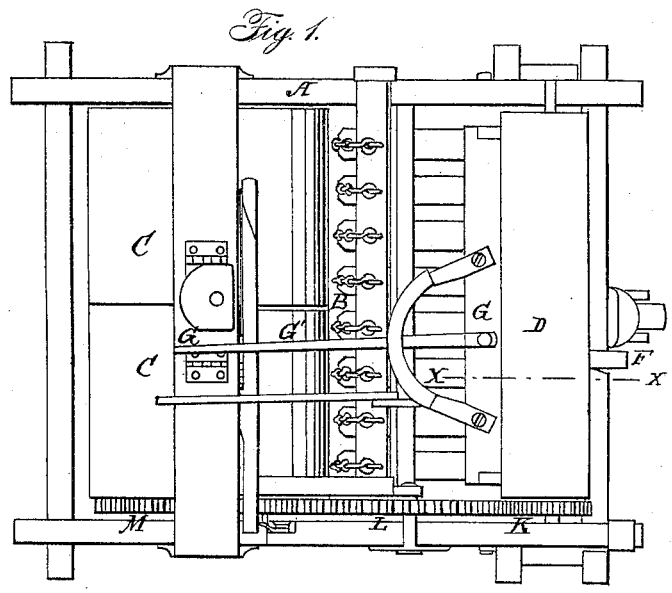
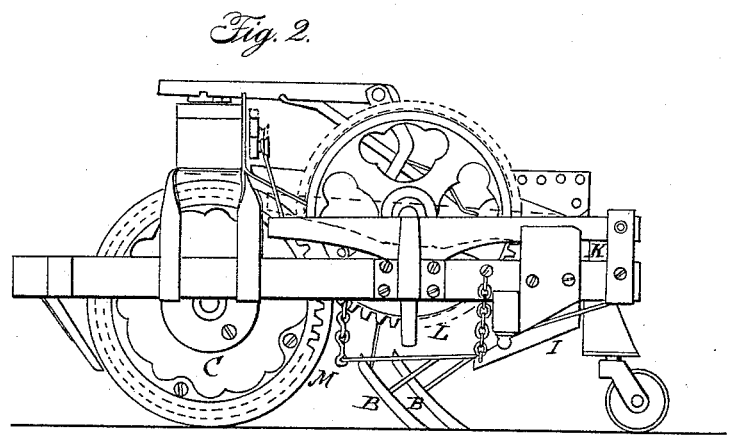
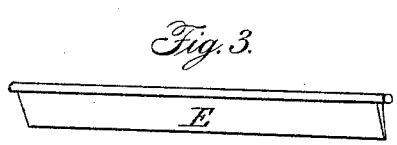
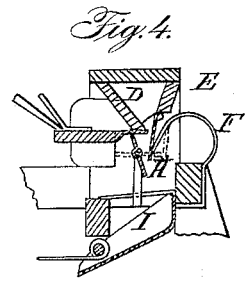
Witnesses:
W. H. Burridge
A. W. McClelland
Inventor:
W. H. Hartman

UNITED STATES PATENT OFFICE.

W. H. HARTMAN, OF FOSTORIA, OHIO.

IMPROVEMENT IN SEEDING-MACHINES.

Specification forming part of Letters Patent No. 51,178, dated November 28, 1865.

*To all whom it may concern:*

Be it known that I, W. H. HARTMAN, of Fostoria, in the county of Seneca and State of Ohio, have invented new and useful Improvements in Seeding-Machines; and I do hereby declare that the following is a full and complete description of the construction and operation of the same, reference being had to the accompanying drawings, making part of this specification, in which—

Figure 1 is a top view. Fig. 2 is a side elevation, and Figs. 3 and 4 are detached parts.

Like letters refer to like parts in the several views.

The points of novelty in this invention are found in the construction of the hopper and the means employed in discharging the seed.

So far as the general structure of the machine is concerned there is nothing peculiar. It consists of a rectangular frame, A, cultivator-teeth B, rollers C, seed-box D, and other minor parts.

The forward side of the seed-box D is provided with a flap or hinge valve, E, which is shown detached in Fig. 3. Its position at the bottom of the seed-box is shown in Fig. 4. It is hinged to the lower edge of the front side of the seed-box, and is pressed backward or inward by a spring, F.

A slide-valve, G, having a handle, G', extending back to the driver's seat, is thereby capable of adjustment so as to open or close the aperture in the bottom of the seed-box to admit of the discharge of more or less seed, as may be desired.

Beneath the slide-valve G and the hinged valve F is placed a butterfly-valve, H, which is caused to rotate in the direction of the arrow in Fig. 4, and in its rotation its two wings alternately press against the hinged valve F and press it forward, thereby carrying with it the desired quantity of seed, which quantity is regulated by the position of the slide-valve G.

Immediately below the valve H there is stretched across the machine an apron, I, which inclines backward and downward, and upon which the grain falls and is scattered broadcast upon the ground. A series of shovels or teeth, B, constructed and attached in the ordinary manner of cultivator-teeth, cover the grain with the soil. A roller or rollers still behind these smooth down the ground.

The rotation of the valve H is caused by a system of gear-wheels, K L M, the latter of which is attached to the end of the roller C, as seen in Figs. 1 and 2. These can be thrown into and out of gear by means of a lever that passes under the driver's seat. The teeth B are raised in the usual manner, and thus the operations of the machine can be suspended at pleasure while being moved from place to place.

What I claim as my improvement, and desire to secure by Letters Patent, is—

1. The hinged valve E, arranged and operated as and for the purpose described.

2. The valve H, constructed, arranged, and operating as specified.

3. The combination of the valve G, seed-hopper D, valves E and H, arranged and operating as set forth.

4. The distributing-apron I, in combination with the valves E and H, when arranged as specified.

W. H. HARTMAN.

Witnesses:
W. H. BURRIDGE,
J. HOLMES.